UNITED STATES PATENT OFFICE.

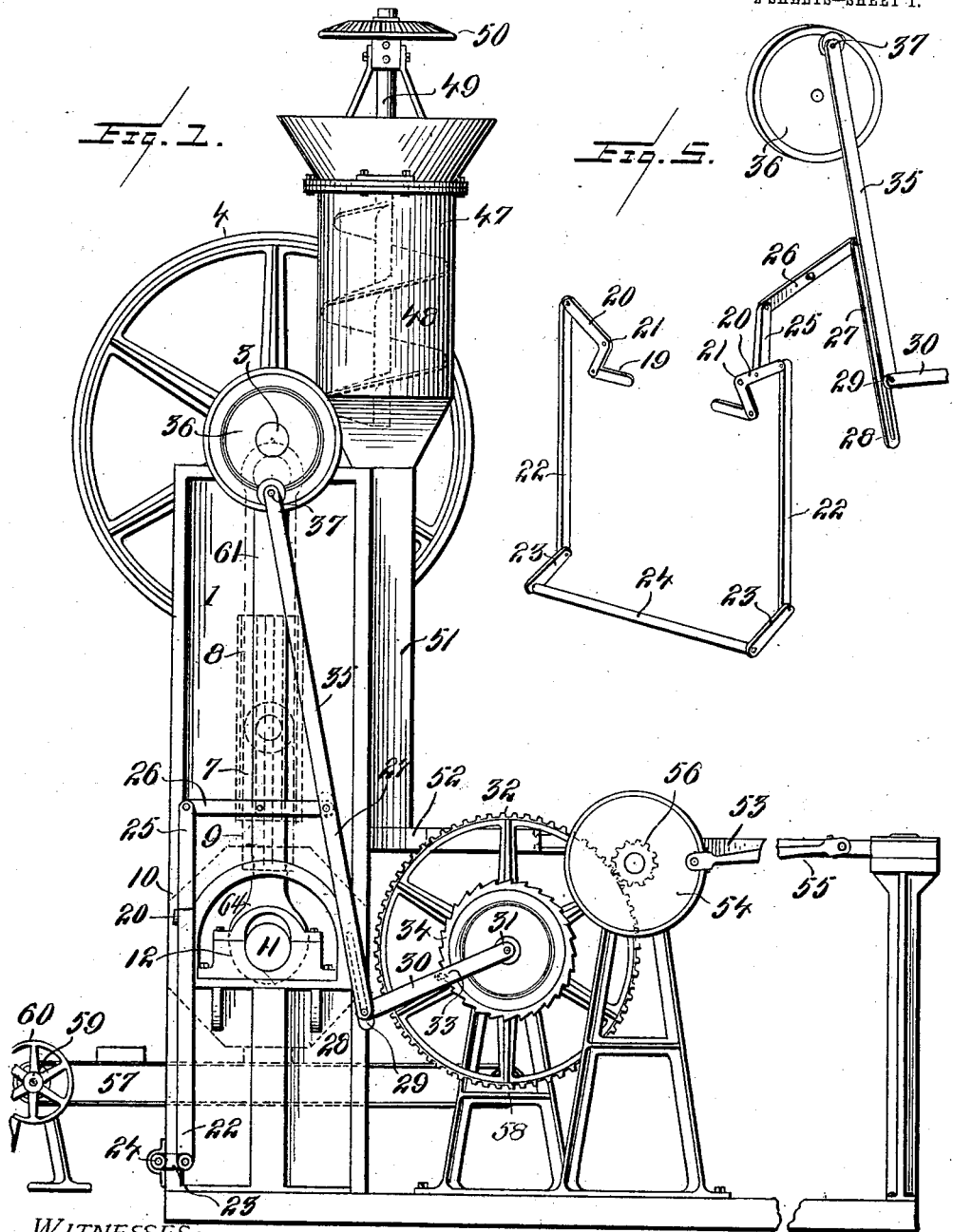

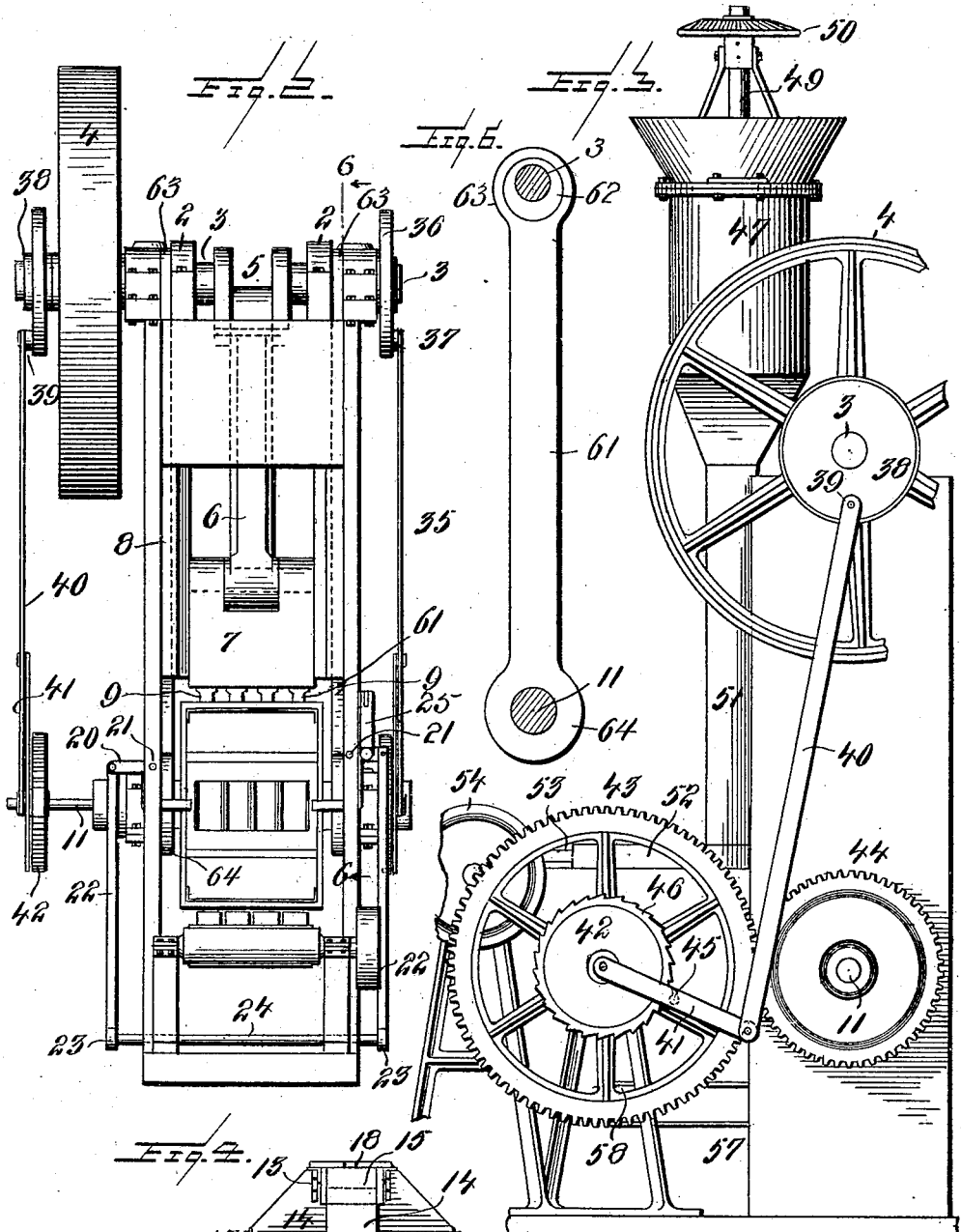

SAMUEL T. H. BRADLEY, OF LAKE CHARLES, LOUISIANA.

BRICK-MOLDING MACHINE.

No. 903,663.   Specification of Letters Patent.   Patented Nov. 10, 1908.

Application filed September 14, 1907. Serial No. 392,914.

*To all whom it may concern:*

Be it known that I, SAMUEL T. H. BRADLEY, citizen of the United States, residing at Lake Charles, parish of Calcasieu, and State of Louisiana, have invented certain new and useful Improvements in Brick-Molding Machines, of which the following is a specification, reference being had therein to the accompanying drawing.

This invention relates to a brick molding machine, and particularly to a construction involving a revolving mold to permit the successive formation of bricks therein.

The invention has for an object to provide a novel and improved construction of the mold and coöperating pressing plunger by which the mold is locked in position during the pressing operation and subsequently released for automatic rotation to deliver the bricks upon the carrier for removal from the machine to a kiln.

Other and further objects and advantages of the invention will be hereinafter set forth and the novel features thereof defined by the appended claims.

In the drawing:—Figure 1 is a side elevation of the machine; Fig. 2 is an elevation at the delivery end of the machine; Fig. 3 is a side elevation at the opposite side of Fig. 1; Fig. 4 is a detail section through the mold; Fig. 5 is a detail perspective of the mold locking mechanism. Fig. 6 is a section on line 6—6, Fig. 2.

Like numerals refer to like parts in the several views of the drawings.

The numeral 1 designates the frame of the machine which is composed of opposite standards provided at their upper portion with bearing boxes 2 adapted to receive the driving shaft 3, said shaft maving belt pulley 4 thereon. This shaft is provided with a crank 5 connected by the pitman 6 with the plunger 7 which is guided by ways 8 at opposite sides of the frame and provided with pressure dies 9 at its lower end adapted to enter the mold boxes. The mold 10 may be of any desired construction, preferably that hereinafter described and provided with the central pivot 11 rotatably mounted in bearings 12 carried by the opposite standards.

The form of mold herein shown comprises the boxes 13 disposed at proper intervals upon the periphery thereof and extending between the oppositely disposed boxes is the ejector 14, as shown in Fig. 4, one end thereof being adapted to form the bottom 15 of one mold box, while the opposite end thereof expels the brick from the diametrically opposite box. These ejectors are provided with elongated slots 16 surrounding the pivot 11 of the mold which is rigidly connected with the side walls 17 thereof which also support the mold box 13 in fixed position relative to the ejectors. The mold is also provided at its periphery with a series of recesses 18 disposed centrally of each mold box and adapted to coöperate with a latch mechanism of any desired construction. A preferable form of this latch comprises the bolt 19 adapted to enter the recesses 18 and carried by the crank levers 20 which are pivotally mounted at 21 in the frame at the sides of the mold, as shown in Figs. 2 and 5. The outer ends of these crank levers are pivotally connected to depending rods 22 extending to crank arms 23 upon a rock shaft 24 disposed at the base of the machine, as shown in Fig. 2. The crank lever at one side of the machine is adapted to be actuated at proper intervals to release and engage a mold by a link 25 connected thereto and to the lever 26 pivoted upon the frame from which lever an operating arm 27 extends and is provided with an elongated slot 28 at its lower end. This slot receives a pin or projection 29 from the ratchet lever 30.

The ratchet lever is loosely mounted upon the shaft 31 of the gear 32 and is provided with the pawl 33 adapted to engage the ratchet wheel 34 secured to this gear for the purpose of driving the same by an intermittent motion. Power is conveyed to the ratchet lever through the connecting rod 35 extending from the plate 36 on the shaft 3 to which it is eccentrically connected at 37 to produce a crank motion.

For the purpose of rotating the mold at proper intervals and by an intermittent motion the shaft 3 is provided with the plate 38 secured thereto with the crank pin 39 and connecting rod 40 extended therefrom to a ratchet lever 41 loosely mounted upon the shaft 42 of the gear wheel 43 which is in mesh with the gear 44 on the shaft 11 of the mold. The ratchet lever is provided with a pawl 45 adapted to coöperate with the ratchet wheel 46 secured to the gear 43.

The material to be molded is fed from the hopper 47 by the spiral screw 48 on the shaft 49 driven by the gear 50. This forces the material through the mold 51 where it is cut off by the feed cutter 52 which is reciprocated within its casing by means of the arm 53 connected with the crank wheel 54 by the pitman 55. This wheel is driven by the pinion 56 upon its hub which meshes with the gear 32, as shown by dotted lines in Fig. 1. Beneath the mold a delivery belt 57 is mounted upon the rolls 58 and 59 so as to remove the molded brick, this belt being adapted to be driven by a pulley 60 on the roll 59.
In the pressing action within the mold box, it is desirable to secure a pressure from the bottom of the box as well as from the plunger and for this purpose the mold shaft 11 is mounted at each end in the hanger 61 having at its lower end a bearing 64 to support the shaft, and supported at its upper end from a cam 62 disposed on the shaft 3 and within the sleeve 63 of the hanger, as shown in Figs. 2 and 6. By this means an upward movement of the mold is secured simultaneously with the downward movement of the plunger 7 so that the material in the mold is pressed from both top and bottom to secure an even texture by an even pressure thereon.

In the operation of the invention the material is fed downward from the hopper by the screw and passes through the die box from which it is forced by the feeding plunger in alinement with the mold box on the top of the rotatable mold. The plunger then descends and forces the material into this box and the mold is simultaneously raised as before described. This feeding action is secured through the medium of the connection from the driving shaft to the ratchet wheel by which the feeding plunger is fed a full inward and outward stroke by each complete stroke of the die plunger. At the completion of these strokes the latches holding the mold are released by their connection with the ratchet mechanism so that the weight of the completed brick in the box at the side of the mold causes it to automatically rotate until this completed brick reaches a position directly beneath the plunger when it is discharged from the mold by forcing the subsequently formed material into the mold box as before described. It will thus be seen that the machine is continuously automatic in both the feeding of the material to the mold and its discharge therefrom, while the mold is rotated through the connections described and held between the intermittent movement thereof by the automatically controlled latch mechanism connected with the driving gear for the feeding plunger. The invention therefore presents a simple, economically constructed and very efficient molding apparatus for the purposes set forth.

Having described my invention and set forth its merits, what I claim and desire to secure by Letters Patent is:—

1. In a molding machine, a feed hopper, a pivoted mold having opposite boxes, connected ejectors disposed in said boxes, a feeding device intermediate the hopper and upper box of said mold to feed thereto, a plunger mounted to enter said upper box in alinement with said connected ejectors, a delivery support beneath said mold, and a contacting abutment within said mold disposed intermediate the connected ejectors to support the ejector in the upper box while permitting free delivery from the lower box to said support.

2. In a molding machine, a feed hopper, a pivoted mold having opposite boxes and connected ejectors therein, means for feeding material to the upper box of said mold, a driving shaft provided with a plunger to enter said upper box in alinement with an oppositely located ejector, a delivery support beneath said mold, and a connection from said shaft to bodily reciprocate said mold simultaneously with the travel of the plunger.

3. In a molding machine, a feed hopper, a pivoted mold having opposite boxes and connected ejectors therein, means for feeding material to the upper box of said mold, a driving shaft provided with a plunger to enter said upper box in alinement with an oppositely located ejector, a delivery support beneath said mold, a connection from said shaft to bodily reciprocate said mold simultaneously with the travel of the plunger, a latch mechanism for said mold during its reciprocatory travel, and controlling mechanism upon said shaft for said latch mechanism.

4. In a molding machine, a feed hopper, a pivoted mold having opposite boxes and connected ejectors therein, means for feeding material to the upper box of said mold, a driving shaft provided with a plunger to enter said upper box in alinement with an oppositely located ejector, a delivery support beneath said mold, a connection from said shaft to bodily reciprocate said mold simultaneously with the travel of the plunger, a latch mechanism for said mold during its reciprocatory travel, a controlling mechanism upon said shaft for said latch mechanism, means for intermittently operating said feeding means, and a connection from said feed operating means to said latch mechanism and driving shaft.

5. In a molding machine, a feed hopper, a pivoted mold having opposite boxes and connected ejectors therein, means for feeding material to the upper box of said mold, a driving shaft provided with a plunger to enter said upper box in alinement with an oppositely located ejector, a delivery support beneath said mold, a connection from said shaft to bodily reciprocate said mold simultaneously with the travel of the plunger, a latch mechanism for said mold during its reciprocatory travel, a controlling mechanism upon said shaft for said latch mechanism, means for intermittently operating said feeding means, a connection from said feed operating means to said latch mechanism and driving shaft, and means from said driving shaft to intermittently rotate said mold.

6. In a molding machine, a frame having a crank shaft mounted at the upper portion thereof, a mold plunger carried by said shaft, a feed hopper, a pivoted mold having opposite boxes and connected ejectors therein, a plunger for feeding material to the upper box of said mold, a driving wheel connected by a pitman to said feed plunger, a gear meshed with said wheel and provided with a ratchet wheel upon its hub, a ratchet lever having a pawl to coöperate with said ratchet wheel, and a connection from said ratchet lever to said crank shaft.

7. In a molding machine, a frame having a crank shaft mounted at the upper portion thereof, a mold plunger carried by said shaft, a feed hopper, a pivoted mold having opposite boxes and connected ejectors therein, a plunger for feeding material to the upper box of said mold, a driving wheel connected by a pitman to said plunger, a gear meshed with said wheel and provided with a ratchet wheel upon its hub, a ratchet lever having a pawl coöperating with said ratchet wheel, a connection from said ratchet lever to said crank shaft, and a latch mechanism coöperating with said mold and connected with the ratchet lever.

8. In a molding machine, a frame, a crank shaft mounted at the upper portion thereof, a rotatable mold mounted at the lower portion of said frame, a plunger connected to said crank shaft and coöperating with said mold, a feeding device, a feeding plunger, a driving wheel connected by a pitman thereto, a gear meshed with said wheel and provided with a ratchet wheel upon its hub, a ratchet lever having a pawl to coöperate with the ratchet wheel, a connection from said ratchet lever to said crank shaft, a latch coöperating with said mold, a lever connected with said latch, and a slotted bar extended from the end of said lever and connected to the outer end of the ratchet lever.

9. In a molding machine, a frame, a crank shaft disposed at the upper portion thereof and provided with eccentric means, a plunger carried by said shaft, a mold having opposite boxes and connected ejectors therein, in alinement with the travel of said plunger, means carried by the mold to limit the travel of said ejectors, means for feeding material to the upper box of said mold, a hanger carried by the eccentric means upon the crank shaft and connected to said mold to reciprocate the latter, a crank carried by said shaft, a driving gear for said feeding means, and a connection from said crank shaft to said gear for intermittently rotating the same.

10. In a molding machine, a frame, a crank shaft disposed at the upper portion thereof and provided with eccentric means, a plunger carried by said shaft, a mold having opposite boxes and connected ejectors therein, in alinement with the travel of said plunger, means carried by the mold to limit the travel of said ejectors, means for feeding material to the upper box of said mold, a hanger carried by the eccentric means upon the crank shaft and connected to said mold to reciprocate the latter, a driving gear for said feeding means, a connection from said crank shaft to said gear for intermittently rotating the same, a gear disposed upon the mold shaft, and a connection from the crank shaft for intermittently rotating the mold shaft gear.

11. In a molding machine, a frame, a driving shaft disposed at the upper portion thereof, a rotatable mold carried by the lower portion thereof and having opposite boxes with connected ejectors therein, means carried by said crank shaft for bodily reciprocating said mold, and a plunger carried by said shaft for simultaneous movement with said mold reciprocating means and in alinement with an oppositely located ejector.

12. In a molding machine, a rotary mold, a latch therefor comprising oppositely disposed bolts, crank levers for actuating said bolts, depending hangers from the outer ends of said crank levers, a rock shaft having arms at its opposite ends connected with said hangers, and means for oscillating one of said crank levers.

13. In a molding machine, a rotary mold, a latch therefor comprising oppositely disposed bolts, crank levers for actuating said bolts, depending hangers from the outer ends of said crank levers, a rock shaft having arms at its opposite ends connected with said hangers, a pivoted lever, a link extending therefrom to one of said crank levers, a slotted arm from the opposite end of said pivoted lever, and a connection for operating said arm.

14. In a molding machine, a rotary mold, a latch therefor comprising oppositely disposed bolts, crank levers for actuating said bolts, depending hangers from the outer ends of said crank levers, a rock shaft having arms at its opposite ends connected with said hangers, a pivoted lever, a link extending therefrom to one of said crank levers, a slotted arm from the opposite end of said pivoted lever, a feeding mechanism, a ratchet wheel, a lever for operating the same, a bar extending from said ratchet wheel to a crank wheel upon the main shaft, and an extension from the pivot of the ratchet lever disposed in the slot of the arm of the latch mechanism.

In testimony whereof I affix my signature in presence of two witnesses.

SAMUEL T. H. BRADLEY.

Witnesses:
I. C. CARTER,
H. L. ROBINSON.